US012361386B2

(12) United States Patent
Brush et al.

(10) Patent No.: US 12,361,386 B2
(45) Date of Patent: Jul. 15, 2025

(54) CALENDAR CONSULTATION DIALOGUE PROCESSOR

(71) Applicant: Microsoft Technology Licensing, LLC, Redmond, WA (US)

(72) Inventors: Alice Jane Bernheim Brush, Bellevue, WA (US); Urmila Singhal, Redmond, WA (US); Ashok Kuppusamy, Mercer Island, WA (US); Suheyla E. B. Onalan, Kirkland, WA (US); Shanna Xiao Chen, Seattle, WA (US); Kelvin K. Tam, Bellevue, WA (US); Sarah N. Siritaratiwat, Seattle, WA (US); Stefan Valianu, Redmond, WA (US); Lisa J. Stifelman, Palo Alto, CA (US); Aleksandr A. Milanin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 17/745,430

(22) Filed: May 16, 2022

(65) Prior Publication Data

US 2023/0368151 A1    Nov. 16, 2023

(51) Int. Cl.
*G06Q 10/00* (2023.01)
*G06F 40/20* (2020.01)
*G06Q 10/1093* (2023.01)
*H04L 67/306* (2022.01)

(52) U.S. Cl.
CPC ......... *G06Q 10/1093* (2013.01); *G06F 40/20* (2020.01); *H04L 67/306* (2013.01)

(58) Field of Classification Search
USPC .............. 705/7.18, 7.19, 7.15; 715/779, 783
See application file for complete search history.

(56) References Cited

U.S. PATENT DOCUMENTS

| 8,838,461 B2* | 9/2014 | Beebe | G06Q 10/1093 705/1.1 |
| 11,120,408 B2* | 9/2021 | Dantuluri | G06Q 10/1093 |
| 11,488,114 B2* | 11/2022 | Ebner | H04L 67/1095 |

(Continued)

OTHER PUBLICATIONS

Freedman, Deborah, et al. "The life history calendar: A technique for collecting retrospective data." Sociological methodology (1988) : 37-68. (Year: 1988).*

(Continued)

*Primary Examiner* — Gurkanwaljit Singh

(57) ABSTRACT

Systems and methods are provided for a calendar consultation with a user. The disclosed technology uses at least a personal profile or a personal scheduling model and identifies issues in scheduled calendar events associated with the user. Based on a number of the identified issues, a calendar consultant informs the user about the identified issues and prompts the user whether to interactively resolve the issues through a calendar consultation session. During the calendar consultation session, the calendar consultant interactively informs about issues, suggests options for resolving the issues, confirms an option to perform, and updates the calendar schedule. The calendar consultant proactively suggests the user to participate in interactive calendar consultation sessions and improves productivity of the user performing tasks.

20 Claims, 10 Drawing Sheets

(56) References Cited

U.S. PATENT DOCUMENTS

| | | | | |
|---|---|---|---|---|
| 2008/0034047 | A1* | 2/2008 | Rosenberg | G06Q 10/109 709/206 |
| 2010/0162105 | A1* | 6/2010 | Beebe | G06Q 10/1093 705/7.18 |
| 2011/0257881 | A1* | 10/2011 | Chen | G01C 21/362 701/465 |
| 2012/0233563 | A1* | 9/2012 | Chakra | G06Q 10/1093 715/772 |
| 2015/0154524 | A1* | 6/2015 | Borodow | H04W 4/029 705/7.23 |
| 2015/0248651 | A1* | 9/2015 | Akutagawa | G06F 16/2465 705/7.19 |
| 2015/0324753 | A1* | 11/2015 | Dantuluri | G06Q 10/1093 705/7.19 |
| 2016/0267439 | A1* | 9/2016 | Bitran | G06Q 10/1095 |
| 2018/0336531 | A1* | 11/2018 | Avalos Vega | G06Q 10/1095 |
| 2019/0244178 | A1* | 8/2019 | Carter | H04L 51/216 |
| 2019/0295018 | A1* | 9/2019 | Borodow | H04M 15/84 |
| 2020/0090134 | A1* | 3/2020 | Bender | G06Q 10/1095 |
| 2020/0274726 | A1* | 8/2020 | Setteboun | G06F 3/04817 |
| 2022/0374843 | A1* | 11/2022 | Syfrig | G06F 3/0481 |

OTHER PUBLICATIONS

Sycara, Katia, and Dajun Zeng. "Coordination of multiple intelligent software agents." International Journal of Cooperative Information Systems 5.02n03 (1996): 181-211. (Year: 1996).*

Clark, Andrew F., and Sean T. Doherty. "Activity rescheduling strategies and decision processes in day-to-day life." Transportation research record 2134.1 (2009): 143-152. (Year: 2009).*

Glezer, C. (1996). A conceptual model and an implementation of an intelligent meeting-scheduler (IMS) (Order No. 9638409) (Year: 1996).*

* cited by examiner

Preferences 302
(regular occurrence)

1) One-on-one, periodic meeting;
2) Meeting with attendance by organizationally primary persons;
3) Reserving a lead-time for preparation of recurring meetings;
4) A superior in the organization in the meeting;
5) I am an organizer of the meeting and 10+ people attending
...

Personal Profile 304
1) work hours: 8am-5pm;
2) Holly, an assistant for Bruce, has authority to schedule/accept events for Bruce.
3) recurring personal meeting: Tuesdays, 5:30-6:00pm
4) workout time: Monday, Wednesday, Friday, 7:00am-8:00am
...

FIG. 3

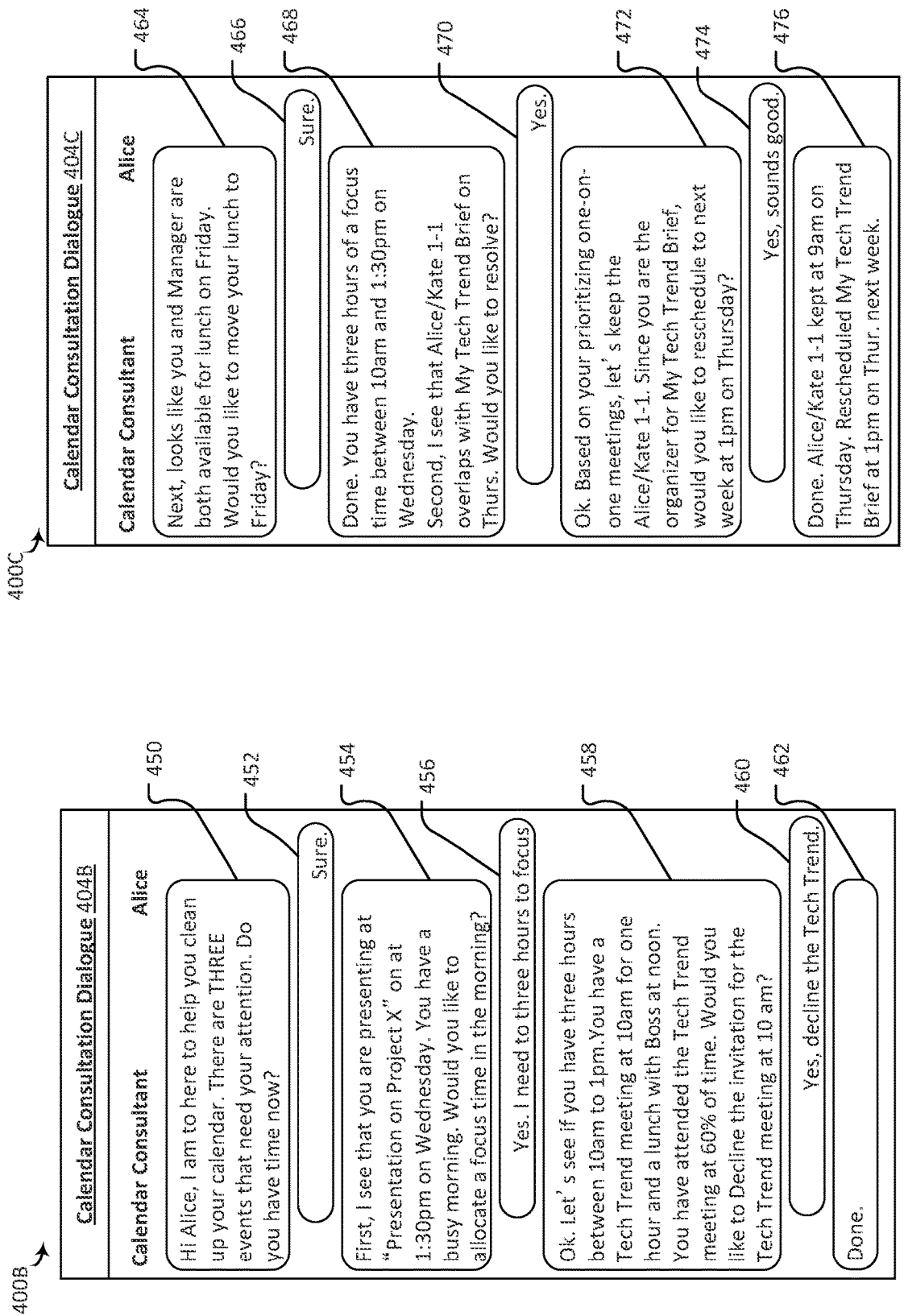

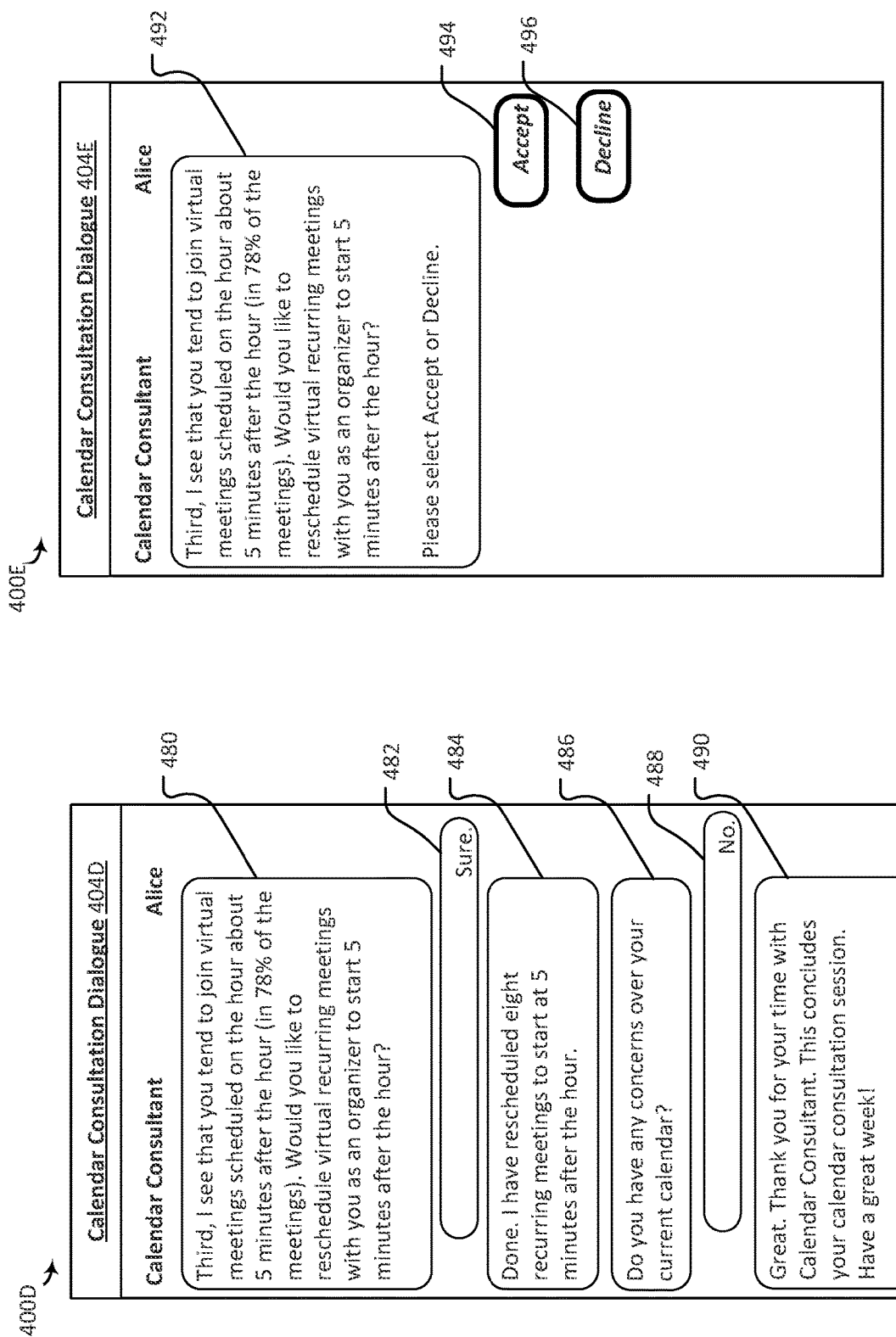

CALENDAR CONSULTATION DIALOGUE PROCESSOR

BACKGROUND

A use of calendar applications for scheduling events and meetings has become commonplace as people try to manage their daily schedules. Often times, however, people feel overwhelmed by the vast volume of events and numerous scheduling conflicts, which take time and energy to resolve and reschedule. Moreover, many people are reactive rather than proactive when it comes to scheduling and they don't realize how their calendars could be optimized.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for interactive calendar consultation. In particular, the disclosure relates to optimizing a user's calendar based on determining the user's time-management goals by evaluating calendar information (such as previous calendar events and user actions) and personal information (such as user interests, goals, personal and/or professional responsibilities, personal and/or professional roles, and the like). The disclosed technology includes proactively prompting a user to join a calendar consultation session during which the personal information may be received. Based on the personal information and the calendar information, the system determines one or more time-management conditions that are customized for the user. The system may then identify scheduled calendar events that are inconsistent with the time-management conditions. The inconsistent calendar events may be provided to the user and, based on the time-management conditions, recommendations for updating the inconsistent calendar event may be automatically generated and provided. Upon approval of the recommendations, the system may automatically update the inconsistent calendar event, while storing user approvals or denials as additional calendar information. The disclosed technology improves work efficiency through proactive calendar event adjustments. In particular, the present disclosure scans and identifies conditions where updating calendar events improves work efficiency of a user according to the time-management conditions. The disclosed technology includes training a personal scheduling model based on the time-management conditions and one or more patterns of event scheduling derived from the calendar information.

In an example, the term "personal information" refers to a set of personal parameters characterizing the way in which a user lives and interacts with others. For example, personal parameters include a user goal, a user value, a user responsibility, a user role, a user preference, and the like. The personal parameters may be stored in a database as a personal profile associated with the user. Also, as an example, the terms "calendar consult" or "calendar consultation" refer to an interactive session with a bot (e.g., a calendar consultant) in which the user provides personal information associated with time-management goals and preferences, reviews calendar events which are inconsistent with the goals or preferences, and/or approves or denies recommendations for resolving inconsistent calendar events. In response to an approval, the system may then automatically modify inconsistent calendar events.

Some examples include a computer-implemented method for a calendar consultation with a user. The method may include receiving calendar information and personal information for a user, wherein the calendar information includes data associated with a plurality of calendar events and user actions, wherein each calendar event comprises an event type and an event context; based on identifying patterns in at least one of the calendar information or the personal information, determining one or more time-management conditions, wherein each time-management condition represents a pattern associated with at least one of the calendar information or the personal information; determining an inconsistency between at least one calendar event and at least one time-management condition of the one or more time-management conditions; generating, based on the inconsistency, a prompt for scheduling a calendar consultation session with the user; in response to a user acceptance of the prompt, causing display of a description of the inconsistency; based on the one or more time-management conditions, automatically generating a recommendation for resolving the inconsistency using a scheduling model trained based on the one or more time-management conditions, wherein the recommendation is a suggestion for updating the at least one calendar event; and causing display of the recommendation and a prompt for an approval. The method further include determining the at least one time-management condition by identifying a pattern associated with a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and determining the inconsistency by identifying a difference between at least one calendar parameter of the calendar event and the at least one time-management condition. The method further includes updating a personal profile with the approval to update the at least one calendar event, wherein the personal profile includes the personal information; and training the scheduling model associated with the user using training data, wherein the training data includes the approval to update the at least one calendar event. The personal information is interactively received in response to a question during a previous calendar consultation session, and wherein the interactively receiving includes using natural language processing of a user input. The calendar consultation session includes causing display of descriptions of a plurality of inconsistencies, wherein the plurality of inconsistencies includes the inconsistency. The calendar consultation session is a recurring calendar event. The personal profile includes the one or more time-management conditions based on the personal information. The trained scheduling model predicts whether the calendar consultation session is needed based on the inconsistency, and automatically generates the recommendation for updating the at least one calendar event to resolve the inconsistency. The personal profile includes one or more priority levels for rescheduling calendar events, wherein the one or more priority levels correspond to whether the user is an organizer of the at least one calendar event, an invitee of the at least one calendar event, a number of participants of the at least one calendar event, and a position within an organization of a participant of the at least one calendar event. The method may further include interactively receiving the approval to update the at least one calendar event to resolve the inconsistency; and automatically updating the at least one calendar event to resolve the inconsistency.

Some examples include a system for a calendar consultation. The system may include a processor; and a memory storing computer-executable instructions that when executed by the processor cause the system to execute a method including receiving calendar information and personal information for a user, wherein the calendar information includes data associated with a plurality of calendar events and user actions, wherein each calendar event comprises an event type and an event context; determining, based on identifying patterns in at least one of the calendar information or the personal information, one or more time-management conditions, wherein each time-management condition represents a pattern associated with at least one of the calendar information or the personal information; determining an inconsistency between at least one calendar event and at least one time-management condition of the one or more time-management conditions; generating, based on the inconsistency, a prompt for scheduling a calendar consultation session with the user; automatically generating, based on the at least one of the one or more time-management conditions, a recommendation for resolving the inconsistency using a scheduling model trained based on the one or more time-management conditions, wherein the recommendation includes updating the at least one calendar event; and causing display of a description of the inconsistency and the recommendation for resolving the inconsistency during the calendar consultation session. The computer-executable instructions when executed by the processor further cause the system to execute a method include determining the at least one time-management condition by identifying a pattern in a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and determining the inconsistency by identifying a difference between at least one calendar parameter of the calendar event and the at least one time-management parameter. The computer-executable instructions when executed by the processor further cause the system to execute a method include updating a personal profile with an approval to update the at least one calendar event, wherein the personal profile includes the personal information; and training the scheduling model associated with the user using training data, wherein the training data includes the approval to update the at least one calendar event. The personal information is interactively received in response to a question during a previous calendar consultation session, and wherein the interactively receiving includes using natural language processing of a user input. The calendar consultation session includes causing display of descriptions of a plurality of inconsistencies, wherein the plurality of inconsistencies includes the inconsistency. The calendar consultation session is a recurring calendar event. The personal profile includes the personal information and the one or more time-management conditions associated with the personal information.

Some examples include a computer-implemented method. The method includes receiving calendar information and personal information for a user, wherein the calendar information includes data associated with a plurality of calendar events and user actions, wherein each calendar event comprises an event type and an event context; determining, based on identifying patterns in at least one of the calendar information or and the personal information, one or more time-management conditions, wherein each time-management condition represents a pattern associated with at least one of the calendar information or the personal information; determining a plurality of instances of inconsistency between at least one time-management condition of the one or more time-management conditions; generating, based on the plurality of instances of inconsistency, a prompt for scheduling a calendar consultation session with the user; and automatically generating, based on the one or more time-management conditions, a recommendation for resolving at least one of the plurality of instances of inconsistency using a scheduling model trained based on the one or more time-management conditions. The method further includes determining the at least one time-management condition by identifying a pattern in a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and determining the at least one of the plurality of instances of inconsistency by identifying a difference between at least one calendar parameter of the calendar event and the at least one time-management condition. The plurality of instances of inconsistency includes an occasion where the user joins a series of routinely scheduled calendar event after a predetermined period of time.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3 illustrates an example data structures in accordance with aspects of the present disclosure.

FIGS. 4A-E illustrate examples of a calendar consultation session on a user interface in accordance with aspects of the present disclosure.

Figure 5:
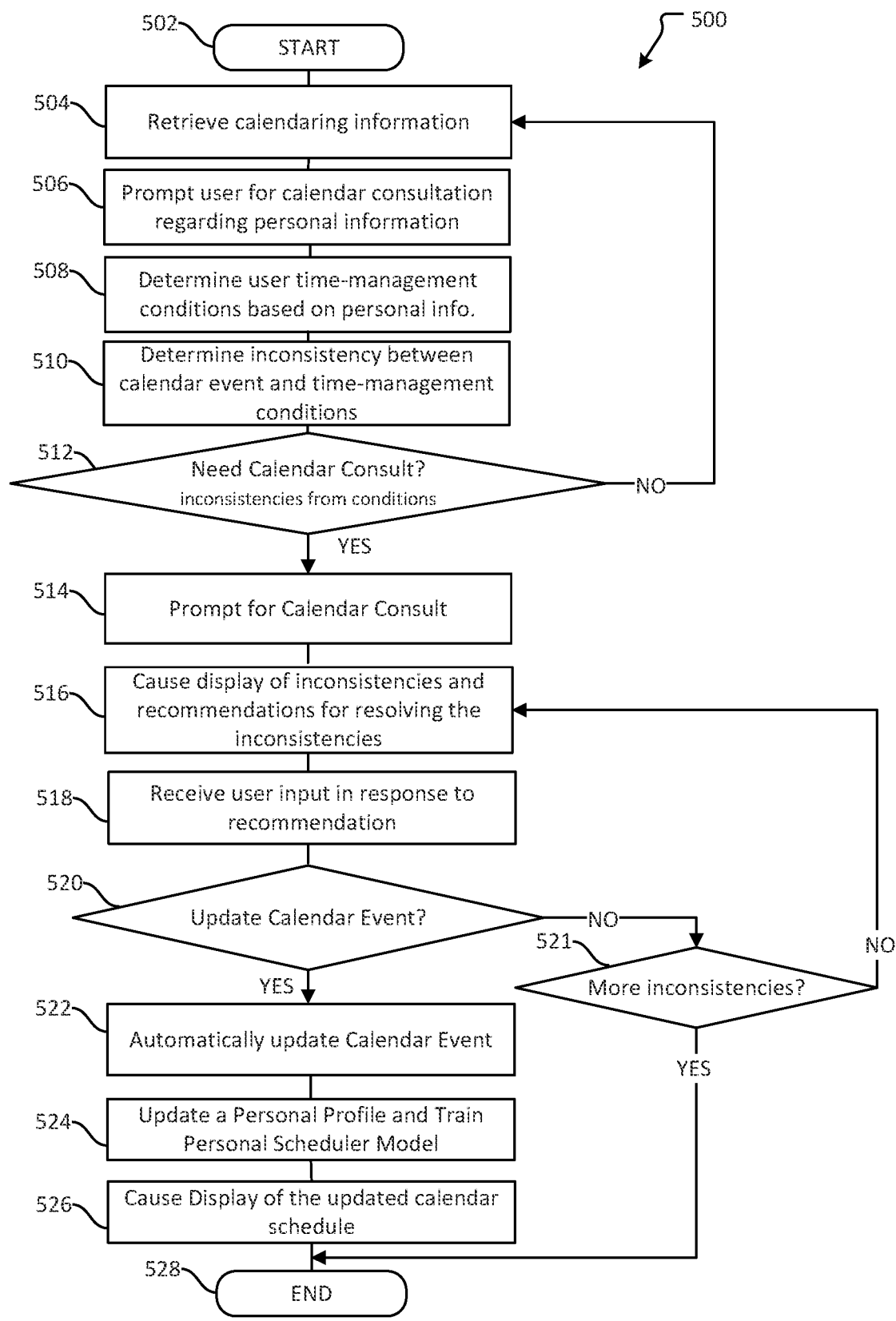

FIG. 5 illustrates an example of a method for automatically updating a calendar event in accordance with aspects of the present disclosure.

Figure 6:
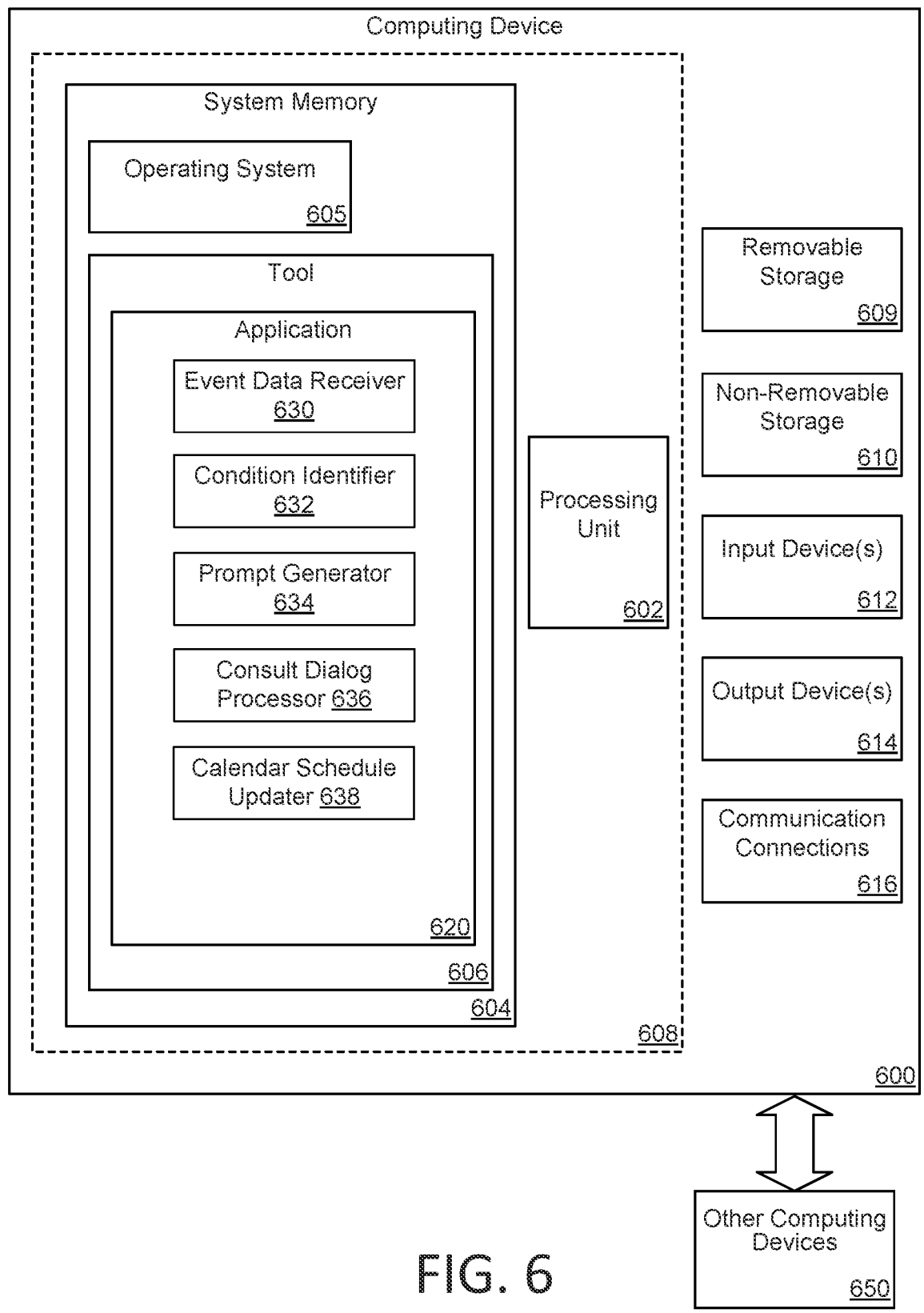

FIG. 6 is a block diagram illustrating example physical components of a computing device with which aspects of the disclosure may be practiced.

Figure 7A:
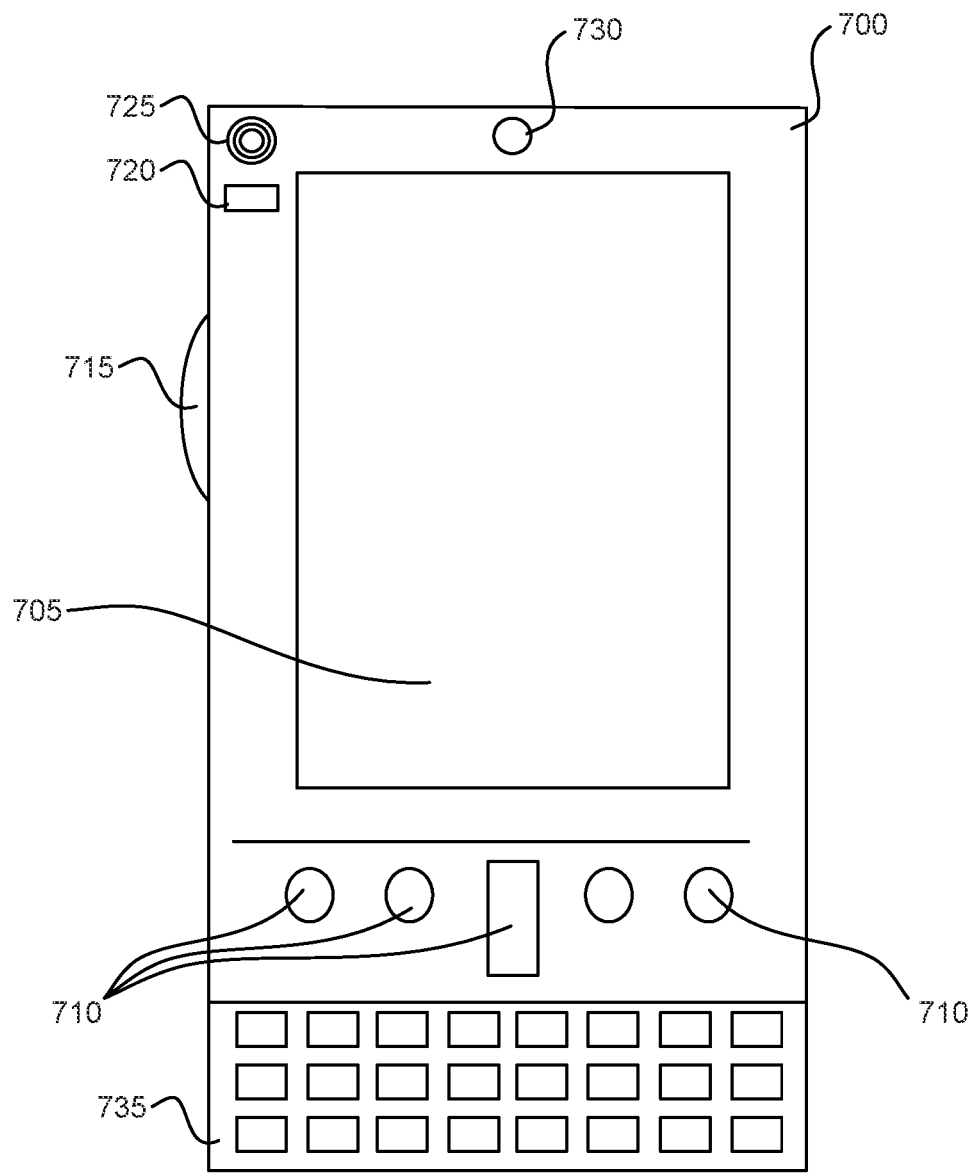

FIG. 7A is a simplified diagram of a mobile computing device with which aspects of the present disclosure may be practiced.

Figure 7B:
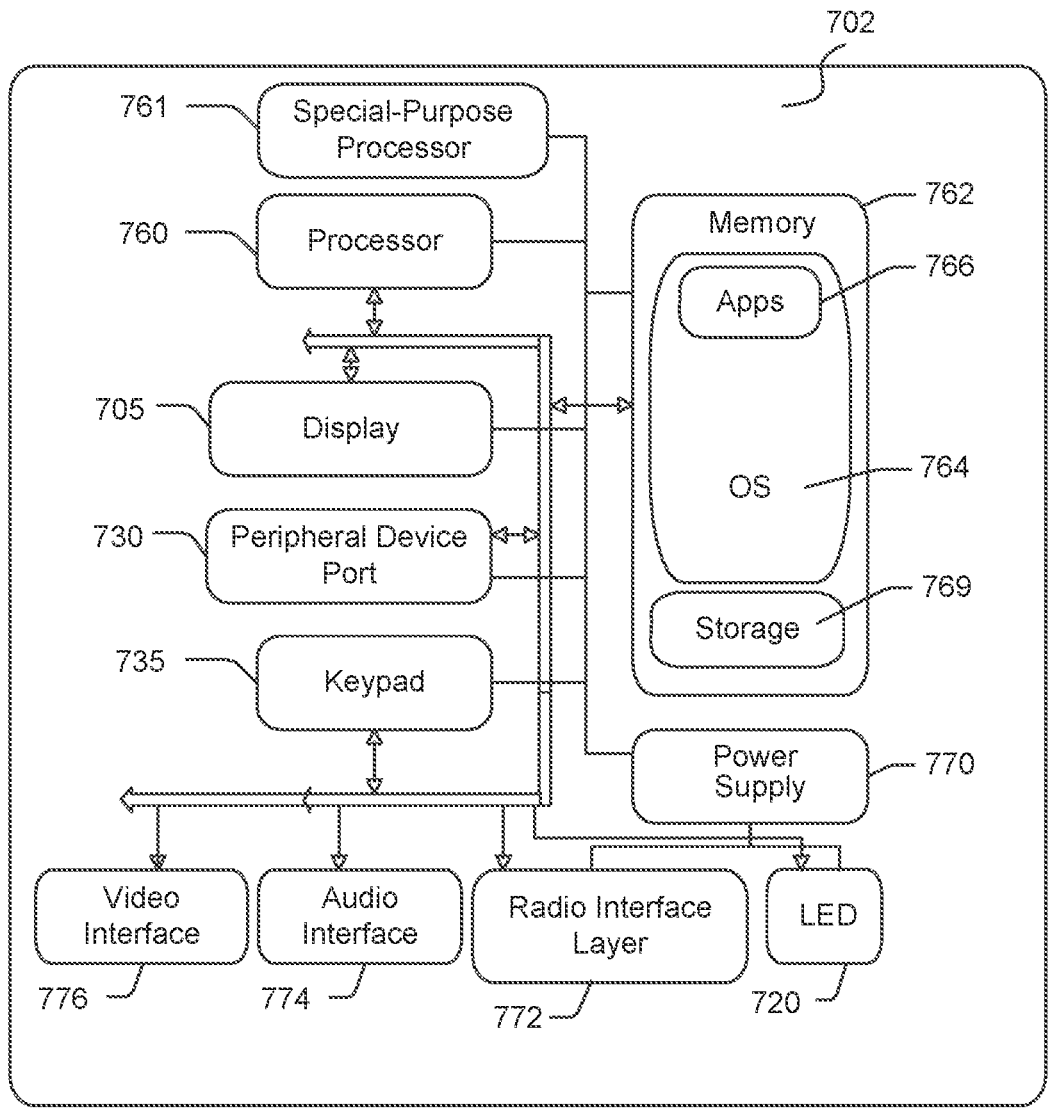

FIG. 7B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Time is a fixed resource and how people spend their time may determine what they accomplish. For busy people, calendars can quickly become overwhelming and often don't align with their overall time-management goals and preferences. Many people review their calendars in advance to prepare for the upcoming week, but this puts the burden on the user to identify issues (often resulting from events scheduled by others) and re-schedule events. This leaves little time to identify proactive optimizations in calendar scheduling to meet long- or short-term time-management goals. For instance, it takes time to review and prepare for upcoming calendar events, which rarely allows the user to consider "how" the events might be arranged or scheduled for more efficiently completing work tasks, reducing distractions from low-priority calendar events, balancing personal goals and responsibilities, ensuring time with family and friends, etc. As a result, while users may know how they would like to spend their time, this may not be reflected in their calendars. Thus, it is difficult for users to optimize calendar efficiencies while minimizing the time required for proactively managing their calendars.

As discussed in more detail below, the present disclosure is directed to a time-management tool, including automatically scheduling, rescheduling, and resolving conflicts for calendar events to achieve a user's time-management goals. Time-management conditions are determined based on an evaluation of calendaring information (e.g., including past and current calendar events, message data, event log data) and personal information (e.g., including user interests, goals, personal and/or professional responsibilities, personal and/or professional roles, and the like). Based on applying the time-management conditions to the user's calendar, inconsistent calendar events may be identified, recommendations for scheduling/rescheduling may be generated, and calendar events may be automatically updated. In this way, the disclosed technology provides customized calendar management by determining time-management conditions for a user and applying the conditions to proactively manage the user's calendar.

The disclosed technology learns the personal information about a user through a question-and-answer conversation during a calendar consultation session. As described above, a calendar consultation session may be an interaction between an application (e.g., bot) and a user in which the application poses questions (written or verbal) and receives user responses (written or verbal) associated with the user personal information. The present disclosure proposes scheduling a calendar consultation session with the user on a recurring basis, which enables the user to review and resolve inconsistent calendar events during an allotted time period. During a calendar consultation session, the disclosed system may review the user's time management goals, suggest appointments or meetings to schedule or reschedule, and automatically perform the rescheduling based on user approval. In aspects, the disclosed technology enables users to optimize their calendars according to their goals without investing substantial time to do so.

Figure 1:
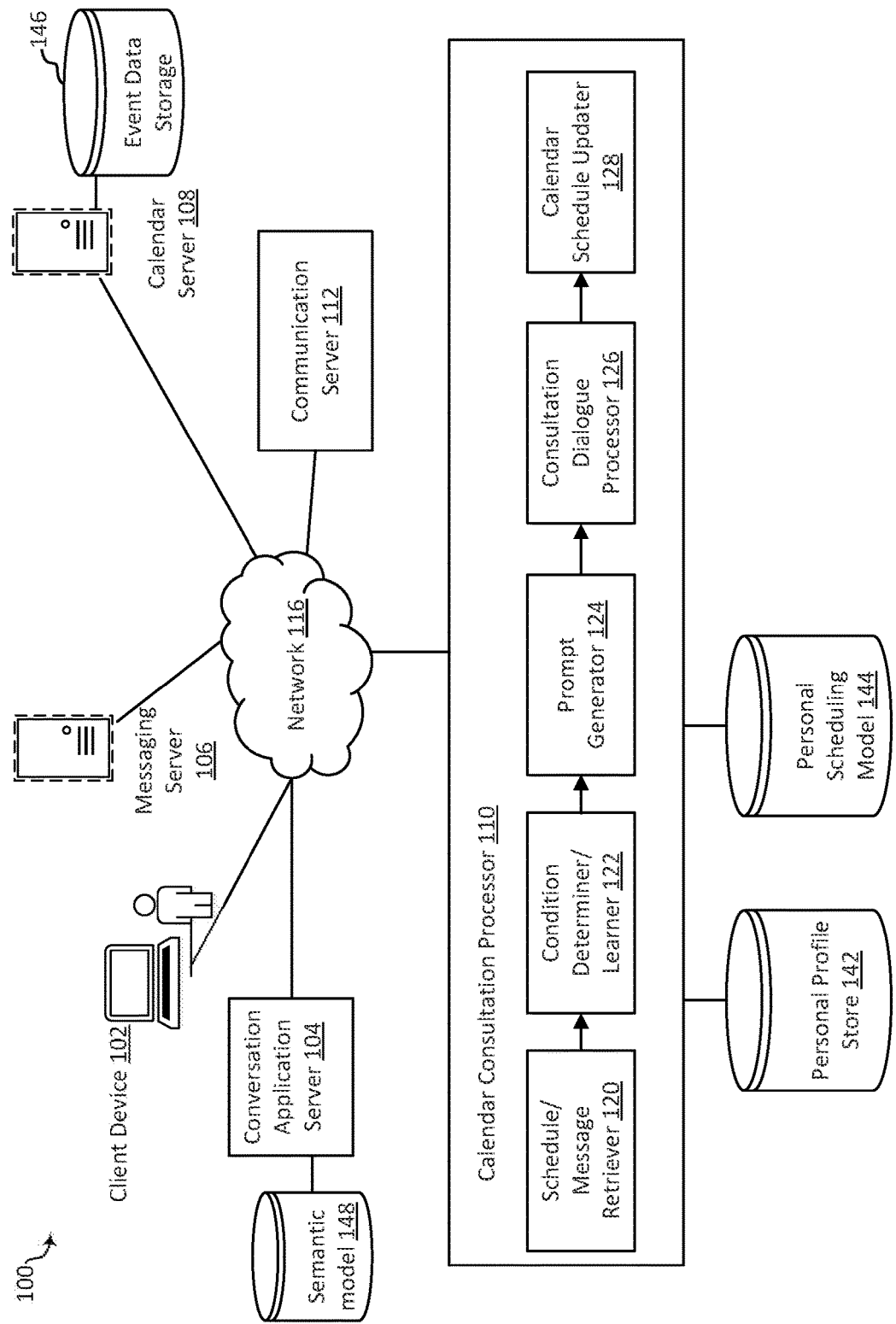
FIG. 1 illustrates an overview of an example system for performing an interactive calendar consultation in accordance with aspects of the present disclosure.

FIG. 1 illustrates an overview of an example system for automatically identifying conditions for calendar consultations with a user and proactively prompts the user for performing an interactive calendar consultation session. The system 100 includes a client device 102, a conversation application server 104 with a semantic model 148, a messaging server 106, a calendar server 108 with an event data storage 146, a communication server 112, and a calendar consultation processor 110 with a personal profile store 142 and a personal scheduling model 144.

The client device 102 interacts with a user who uses various applications including a calendar application. The client device 102 may include a user interface for the user to interactively create and edit calendar events. The client device 102 may further provides an interactive bot interface to enable the user to communicate with various bots including a calendar consultant (e.g., a calendar co-pilot, a bot, and the like) to interactively update calendar schedules through natural language conversations.

The conversation application server 104 performs interactive conversations with the user in a natural language. The conversation application server 104 may use the semantic model 148 to interpret semantics of utterances or texts received from the user using the client device 102. In aspects, the semantic model 148 is trainable based on training data and/or through conversations with the user.

The messaging server 106 performs messaging services. In an example, the messaging server 106 provides an email service, a chat service, and the like. In aspects, the communication server 112 may include a chat service between the user and a bot (e.g., a digital assistant). Communications may include text, audio, and/or video. The conversation application server 104 may process input as entered by the user using the client device 102 through communication server 112.

The calendar server 108 provides a calendar service to the user. In aspects, the calendar server 108 creates and maintains calendar events in event data storage 146. For instance, calendar server 108 may store calendar information including previous calendar events and user actions. The calendar information includes a set of calendar parameters characterizing how the user schedules, attends, declines, and modifies calendar events. The calendar parameters may include a scheduled time, a scheduled date, a schedule duration, an actual duration, a role (e.g., an organizer or a participant), a join time, a leave time, a modification of a calendar event, a topic, other participant(s), other participant(s) role(s), and the like. The calendar server 108 may receive a request from the user to create a new calendar event, send a meeting invite to designated participants, and update a calendar event based on responses received from the designed participants to the calendar event. The calendar event may include a meeting among a plurality of participants, a focused time (i.e., a time reserved for the user), and the like.

The communication server 112 provides communication services to the user and stores event logs of previous communications that have taken place. Examples of the communication service may include a video/audio conferencing service. In aspects, the communication server 112 may maintain an event log (not shown) that records dates/times of previous calendar events, including meetings, appointments, video/audio conferences, and the like. For example, the communication server 112 may maintain when a meeting scheduled among participants actually started and ended and actual participants who joined the meeting.

The calendar consultation processor 110 processes a calendar consultation session. In aspects, the calendar consultation processor 110 provides a bot-based interactive calendar consultation session via the conversation application server 104 with the user using the client device 102. The calendar consultation processor 110 includes a schedule/message retriever 120, a condition determiner/learner 122, a prompt generator 124, a consultation dialogue processor 126, and a calendar schedule updater 128.

The schedule/message retriever 120 retrieves data corresponding to current calendar events, messages, communication logs, and the like. The calendar consultation processor 110 determines whether the retrieved data satisfies one or more predetermined conditions (e.g., user time-management conditions). For instance, the time-management conditions may be determined based on a personal profile using a personal scheduling model 144. In aspects, the personal profile may be generated based on personal information received during a calendar consultation session. In aspects, the schedule/message retriever 120 uses application programming interfaces (APIs) published by the calendar server 108 and the communication server 112.

The condition determiner/learner 122 determines one or more time-management conditions associated with the user based on the calendar information and the personal profile. The one or more time-management conditions may be determined by identifying patterns in the set of calendar parameters associated with the calendar information and/or the set of personal parameters associated with the personal profile. In aspects, the one or more time-management conditions may comprise one or more time-management parameters, where each time-management parameter represents a pattern associated with a calendar parameter or a personal parameter. For example, a pattern associated with a calendar parameter may indicate that the user's join time is consistently five minutes after the hour. In this example, a time-management condition may be determined that includes one or more time-management parameters representing the pattern of the calendar parameter, for example, when the user is an organizer (first time-management parameter), a scheduled time should be five minutes after the hour (second time-management parameter). As another example, a pattern associated with a personal parameter may indicate a user preference to schedule focused time before a presentation. In this case, a time-management condition may be determined that includes one or more time-management parameters representing the personal parameter, for example, when the user is a presenter for a calendar event (first time-management parameter), a focused time should be scheduled before the calendar event (second time-management parameter). In aspects, the personal profile store 142 includes a database that stores the personal parameters associated with the personal information and the determined user time-management conditions, which may include a set of rules.

Based on the one or more time-management conditions, the condition determiner/learner may identify one or more calendar events that are inconsistent with at least one time-management condition. For instance, a calendar event may be inconsistent with a time-management condition based on a scheduling conflict with another calendar event and/or based on determining a difference between at least one calendar parameter of the calendar event and at least one time-management parameter of the time-management condition. With references to the first example above, a calendar event may be identified that has the user as the organizer (first calendar parameter) and includes a scheduled time on the hour (second calendar parameter). As noted above, the time-management condition may specify that, when the user is an organizer (first time-management parameter), a scheduled time should be five minutes after the hour (second time-management parameter). In this example, an inconsistency between the calendar event and the time management condition may be determined based on the second calendar parameter of the calendar event (scheduled time on the hour) conflicting with the second time-management parameter of the time-management condition (specifying that a scheduled time should be five minutes after the hour) when the user is an organizer.

With references to the second example above, a calendar event may be identified in which the user is a presenter (first calendar parameter), and a focused time is not scheduled before the calendar event (second calendar parameter). As noted above, a time-management condition may specify that, when the user is a presenter for a meeting (first time-management parameter), a focused time should be scheduled before the meeting (second time-management parameter). In this case, an inconsistency may be determined between the calendar event and the time management condition based on the second calendar parameter of the calendar event (a focused time is not scheduled before the calendar event) conflicting with the second time-management parameter of the time-management condition (specifying that a focused time should be scheduled before a calendar event) when the user is a presenter.

Additionally, or alternatively, the condition determiner/learner 122 may train the personal scheduling model 144 (described further below) based on the determined time-management conditions to predict and/or infer that a calendar event is inconsistent with at least one time-management condition. In aspects, the personal scheduling model 144 may request a calendar consultation session in response to identifying an inconsistent calendar event or determining that personal information associated with the personal profile is missing or outdated. In aspects, the request for the calendar consultation session may be in the form of a selectable prompt, which may initiate the calendar consultation session upon selection by the user. Examples of an inconsistent calendar event may include a scheduling conflict, an insufficient lead time in preparing for a calendar event (e.g., a presentation), adjusting a start time or an end time of a recurring event based on user actions associated with previous calendar events (e.g., canceling, starting late or ending early, and the like). The personal scheduling model 144 further predicts and automatically generates, based on the determined time-management conditions, an optimal schedule for a plurality of calendar events associated with the user as a recommendation.

The prompt generator 124 generates a prompt, which may notify the user of the determined scheduling issues and request a calendar consultation session for resolving the issues. In aspects, the prompt generator 124 generates the prompt when a plurality of calendar events is associated with scheduling issues. In an example, the present disclosure proactively prompts the user to allocate a time during which the user can be focused on the determined scheduling issues and is willing to work with the interactive calendar consultation bot or a calendar consultant (e.g., as processed by the calendar consultation processor 110) for some expected time duration. In some aspects, the prompt generator 124 may further include determining an inconsistency between a user action and at least one time-management condition. The prompt generator 124 may generate a prompt for initiating a calendar consultation session when an inconsistency exists between a user action and the at least one time-management condition. In aspects, a calendar consultation session may take place for about 15 minutes or about 30 minutes to pose and confirm personal information, pose calendar events that are determined to be inconsistent with the at least one time-management condition, and provide recommendations for resolving the inconsistency. In an example, the prompt generator 124 generates the prompt in conjunction with the conversation application server 104 and receives a confirmation from the user through a dialogue (e.g., a chat, a voice message, and the like) in a natural language.

The consultation dialogue processor 126 processes a dialogue with the user during a calendar consultation session, which may include multiple steps. For instance, in response to the user selecting and/or accepting the prompt, the consultation dialogue processor 126 may present the inconsistencies (e.g., scheduling issues) determined by the condition determiner/learner 122 to the user. In some cases, the consultation dialogue processor 126 may present a plurality of inconsistent calendar events at the same time. The consultation dialogue processor 126 describes each of the calendar events, such as by date, time, title, one or more confirmed participants, whether the user is an organizer or a participant of the calendar events, whether the participants or the user have accepted an event invitation (depending on whether the user is an organizer or an invitee of the inconsistent calendar event), and the like.

Next, the consultation dialogue processor 126 may retrieve one or more recommendations for resolving the one or more inconsistent calendar events from the condition determiner/learner 122. The consultation dialogue processor 126 may present the recommendations by providing options for resolving the issue during the calendar consultation session. For example, the consultation dialogue processor 126 may convey multiple options with a reason for each option, such as suggesting keeping a first event of the two double-booked events but declining a second event. In this example, the first event may be a one-on-one meeting invited by the user's superior (e.g., a manager) whereas the second event may be a lunch appointment with a friend. In aspects, the consultation dialogue processor 126 may suggest keeping a calendar event that would be more important to the user than another calendar events. Additionally, or alternatively, the consultation dialogue processor 126 may recommend rescheduling the second calendar event when the user is an organizer of the second calendar event. In aspects, the consultation dialogue processor 126 may determine candidate dates/times for rescheduling the first or second event based on calendar event data retrieved from the calendar server 108 with the event data storage 146. In aspects, the event data storage 146 includes a database for searching and retrieving calendar information indexed by, for example, the set of calendar parameters including a scheduled time, a scheduled date, a schedule duration, an actual duration, a role (e.g., an organizer or a participant), a join time, a leave time, a modification of a calendar event, a topic, other participant(s), other participant(s) role(s), and the like. Thereafter, during the calendar consultation session, the consultation dialogue processor 126 may receive a confirmation and/or a selection of an option by the user for rescheduling an event to resolve the inconsistency.

Thereafter, during the calendar consultation session, the consultation dialogue processor 126 may include automatically updating a scheduled calendar event based on the confirmation or the selection by the user. In aspects, the consultation dialogue processor 126 may also receive one or more candidate dates/times from the user and request the calendar server 108 to transmit an updated meeting invitation with the candidate dates/times.

The calendar schedule updater 128 may receive the confirmation and/or the selection by the user from the consultation dialogue processor 126 and may automatically update a calendar event based on a result from the calendar consultation session. Based on a confirmed response (e.g., approve or deny) by the user, the calendar schedule updater 128 communicates with the calendar server 108 to update the calendar event. In an example, the calendar schedule updater 128 may modify a time/date for a calendar event or cancel a calendar event.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
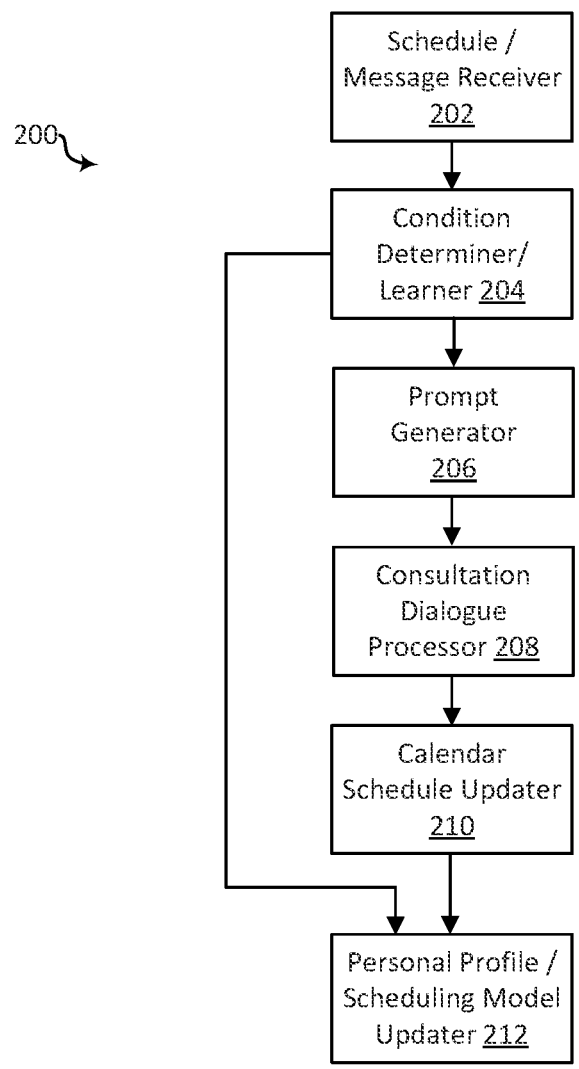
FIG. 2 illustrates an overview of a calendar consultation processor in accordance with aspects of the present disclosure.

FIG. 2 illustrates an exemplar calendar consultation processor according to aspects of the present disclosure. The processor 200 includes a schedule/message receiver 202, a condition determiner/learner 204, a prompt generator 206, a consultation dialogue processor 208, a calendar schedule updater 210, and a personal profile/scheduling model updater 212.

The schedule/message receiver 202 receives current calendar events associated with a user from a calendar server (e.g., the calendar server 108 with the event data storage 146 as shown in FIG. 1). In aspects, the schedule/message receiver 202 further receives messages and logs associated with communications (e.g., video/audio conferences) from the application servers (e.g., the communication server 114 as shown in FIG. 1).

The condition determiner/learner 204 determines one or more time-management conditions associated with the user based on the calendar information and the personal profile, for example. The one or more time-management conditions may be determined by identifying patterns in the set of calendar parameters associated with the calendar information and/or the set of personal parameters associated with the personal profile. In aspects, the one or more time-management conditions may comprise one or more time-management parameters, where each time-management parameter represents a pattern associated with a calendar parameter or a personal parameter. A pattern associated with a calendar parameter may indicate that the user's join time is consistently five minutes after the hour. In this example, a time-management condition may be determined that includes one or more time-management parameters representing the pattern in the calendar parameter, for example, when the user is an organizer (first time-management parameter), a scheduled time should be five minutes after the hour (second time-management parameter). As another example, a pattern associated with a personal parameter may indicate a user preference to schedule focused time before a presentation. In this case, a time-management condition may be determined that includes one or more time-management parameters representing the pattern in the personal parameter, for example, when the user is a presenter for a calendar event (first time-management parameter), a focused time should be scheduled before the calendar event (second time-management parameter).

Based on the one or more time-management conditions, the condition determiner/learner 204 identifies one or more calendar events that are inconsistent with at least one time-management condition. For instance, a calendar event may be inconsistent with a time-management condition based on a scheduling conflict with another calendar event and/or based on determining a difference between at least one calendar parameter of the calendar event and at least one time-management parameter of the time-management condition. With references to the first example above, a calendar event may be identified that has the user as the organizer (first calendar parameter) and includes a scheduled time on the hour (second calendar parameter). As noted above, the time-management condition may specify that, when the user is an organizer (first time-management parameter), a scheduled time should be five minutes after the hour (second time-management parameter). In this example, an inconsistency between the calendar event and the time management condition may be determined based on the second calendar parameter of the calendar event (scheduled time on the hour) conflicting with the second time-management parameter of the time-management condition (specifying that a scheduled time should be five minutes after the hour) when the user is an organizer.

With references to the second example above, a calendar event may be identified in which the user is a presenter (first calendar parameter), and a focused time is not scheduled before the calendar event (second calendar parameter). As noted above, a time-management condition may specify that, when the user is a presenter for a meeting (first time-management parameter), a focused time should be scheduled before the meeting (second time-management parameter). In this case, an inconsistency may be determined between the calendar event and the time management condition based on the second calendar parameter of the calendar event (a focused time is not scheduled before the calendar event) conflicting with the second time-management parameter of the time-management condition (specifying that a focused time should be scheduled before a calendar event) when the user is a presenter.

In aspects, the condition determiner/learner 204 may use a combination of calendar information, such as previous calendar events and user actions associated with previous calendar events, associated with a calendar and user actions from event logs. The condition determiner/learner 204 may determine an inconsistency between calendar event data and the user actions. For example, the condition determiner/learner 204 may compare data from calendar event data and user actions in actual event data and identify an inconsistency where the user typically joins a video conference about five minutes into a scheduled time when the video conference is scheduled to being on the hour.

In aspects, the condition determiner/learner 204 includes soliciting for personal information associated with the user. The personal information may include a role of the user in an organization (e.g., a manager, an engineer, a mother, and the like). The condition determiner/learner 204 may prompt the user with questions for receiving the personal information. In aspects, interactively receiving personal information about the user may improve accuracy in determining one or more time-management conditions based on the personal preferences of the user.

In aspects, the condition determiner/learner 204 identifies a plurality of calendar events that need the user's attention and review based on inconsistency between calendar event data and the user actions. The present disclosure may aggregate multiple calendar events for a review during a calendar consultation session. In some other aspects, the present disclosure may identify a scheduling conflict, a set of calendar events that are tightly scheduled without a break, and the like, as a candidate topic for the calendar consultation session. In some aspects, the condition determiner/learner 204 operation is followed by a personal profile/scheduling model updater 212, which updates a personal profile of the user and/or the scheduling model updater 212 based on personal information and time-management conditions. For example, the condition determiner/learner 204 may determine that the user arrives at scheduled recurring team meetings five minutes late during the past five meeting when the team meetings are scheduled to start on the hour. Based on the findings the condition determiner/learner 204 may record statistical data including the five-minute late arrivals and may further train the scheduling model to suggest rescheduling future team meetings such that a start time of the team meetings to be delayed by five minutes when the team meeting is to start on the hour.

The prompt generator 206 generates a prompt, which may notify the user of the determined scheduling issues and request a calendar consultation session for reviewing, confirming, and updating a calendar schedule. In some aspects, the prompt generator 206 may further include determining an inconsistency between a user action and at least one time-management condition. The prompt generator 206 may generate a prompt for initiating a calendar consultation session when an inconsistency exists between a user action and the at least one time-management condition.

The consultation dialogue processor 208 processes an interactive dialogue with the user during a calendar consultation session, which may include multiple steps. First is for the consultation dialogue processor 208 to present and describe a plurality of inconsistent calendar events based on date/time, participants, a role of the user in the calendar events, and the like. Next, the consultation dialogue processor 208 may retrieve one or more recommendations for resolving the one or more inconsistent calendar events. Thereafter, during the calendar consultation session, the consultation dialogue processor 208 may receive a confirmation from the user for resolving the plurality of inconsistent calendar events.

In aspects, the consultation dialogue processor 208 may communicate with a conversation server with a semantic model (e.g., the conversation application server 104 with the semantic model 148 as shown in FIG. 1) for communicating with the user via a user interface in a natural language text or voice. For example, the consultation dialogue processor 208 may provide a list of agenda for the calendar consultation session, informing of scheduling conflicts that need user attention, confirming with the user whether to change one or more calendar events.

The calendar schedule updater 210 may receive the confirmation and/or the selection by the user from the consultation dialogue processor 208 and may automatically update a calendar schedule based on confirmations received from the user. In an example, updating the calendar may include but not limited to creating a newly calendar event, modifying dates/time and other information associated with an existing event, accepting/declining an invitation to an event, and canceling a calendar event. In aspects, the calendar schedule updater 210 may communicate with a calendar server (e.g., the calendar server 108 as shown in FIG. 1) for updating calendar events.

The personal profile/scheduling model updater 212 may automatically update a personal profile associated with the user based on confirmed rules for scheduling events for the user. Additionally, or alternatively, the personal profile/scheduling model updater 212 may update and/or train the scheduling model based on the confirmation by the user about time-management conditions. For example, the consultation dialogue processor 208 may inquire the user whether the user wishes to schedule a video conference meeting to start at 5 minutes after the hour when the video conference is originally scheduled to start on the hour, based on the user's habit and/or tendencies to join video conferences five minutes into scheduled time periods. The personal profile/scheduling model updater 212 may train the scheduling model associated with the user to schedule future video conferences at five minutes into the hour instead of starting on the hour.

As will be appreciated, the various methods, devices, applications, features, etc., described with respect to FIG. 2 are not intended to limit the processor 200 to being performed by the particular applications and features described. Accordingly, additional controller configurations may be used to practice the methods and systems herein and/or features and applications described may be excluded without departing from the methods and systems disclosed herein.

FIG. 3 illustrates example data structure in accordance with aspects of the present disclosure. In particular, FIG. 3 illustrates an example list of user preferences 302 of calendar events, which may be identified as user time-management conditions. For example, the user may have a preferred cadence for recurring meetings (e.g., weekly, monthly) or may prioritize one-on-one meetings, periodic meetings, meetings with organizationally superior people (e.g., a manager is attending the meeting), etc. In aspects, the user may prefer to maintain a preferred cadence for recurring meetings and may not wish to reschedule prioritized meetings. Some other rules may include but are not limited to reserving a lead-time before a calendar event for preparation when the user is presenting or is an organizer of the meeting, rescheduling recurring meetings for which less than a threshold of invitees have accepted, and the like.

In aspects, the example data structures may include a personal profile 304. The personal profile 304 may be associated with personal information associated with the user, such as work hours of the user (e.g., from 8 am to 5 pm), a designation of a proxy contact (e.g., someone authorized to schedule or accept meetings for the user), a recurring personal meeting (e.g., Tuesdays, 5:30-6:00 pm), a preferred workout time (e.g., Mondays, Wednesdays, Fridays, 7:00-8:00 am), and the like. In an example, the personal information associated with personal profile 304 may be received during a calendar consultation session.

Figure 4A:
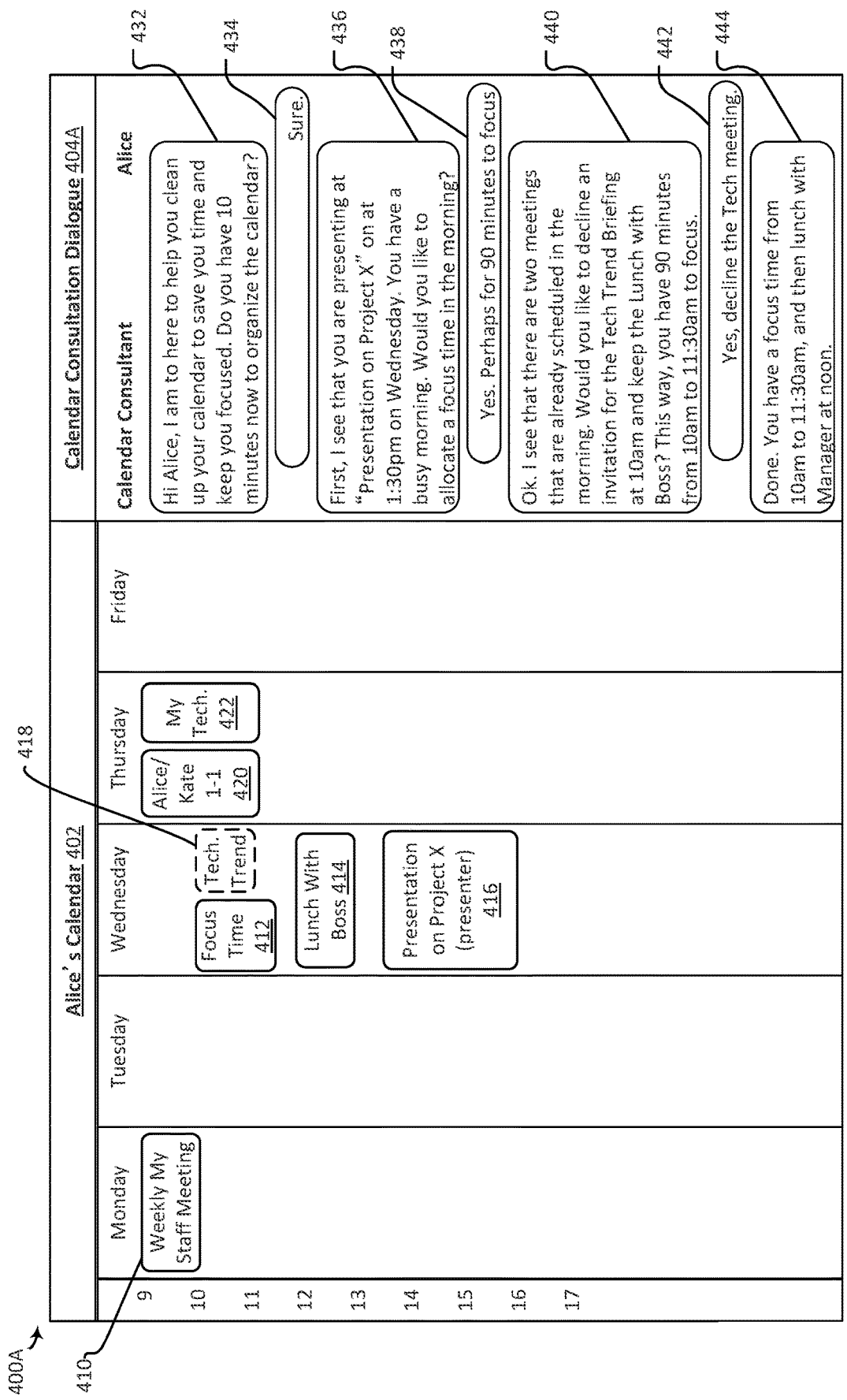

FIGS. 4A-E illustrate examples of graphical user interface (GUI) according to aspects of the present disclosure. FIG. 4A illustrates an example GUI 400A of a calendar with a calendar consultation dialogue between a calendar consultant (e.g., a calendar co-pilot, a bot, and the like) and a user (e.g., Alice). The example GUI 400A includes an area to display Alice's calendar 402 and a calendar consultation dialogue 404A. As illustrated, Alice's calendar 402 includes calendar events associated with Alice.

For example, the Alice's calendar 402 indicates days of the week (e.g., Monday, Tuesday, Wednesday, Thursday, and Friday) in columns and times of the day in rows. The Alice's calendar 402 shows calendar events during the five-day period. For example, A recurring meeting 410 titled "Weekly My Staff Meeting" is scheduled between 9 am and 10 am on Monday. A focus time 412 is scheduled and accepted by the user between 10 am and 11:30 am on Wednesday. A Technical Trend Brief meeting 418 is scheduled but not accepted by the user between 10 am and 11 am on Wednesday. A lunch with boss 414 is scheduled between noon and 1 pm on Wednesday. A meeting 416 on Presentation on Project X (presenter), during which the user is the presenter, is scheduled between 1:30 pm and 4 pm on Wednesday. An Alice/Kate one-on-one meeting 420 (e.g., a one-on-one meeting between Alice and Kate) is scheduled between 9 am and 11 am on Thursday. A My Tech meeting 422 (e.g., a brief meeting on the latest technology the user currently works on) is scheduled between 9 am and 11 am on Thursday.

The calendar consultation dialogue 404A indicates an exchange of texts (e.g., chat, messages, and the like) between a calendar consultant (e.g., the bot) and Alice (e.g., the user) according to aspects of the present disclosure. In an example, the calendar consultation dialogue 404A indicates content of a calendar consultation session. The user may enter an utterance, a question, or a response in natural language in the calendar consultation dialogue 404A.

In a text 432, the calendar consultant inquires if the user is willing to allocate time (e.g., 10 minutes now) for having an interactive calendar consultation session to organize the user's calendar. "Hi Alice, I am to here to help you clean up your calendar to save you time and keep you focused. Do you have 10 minutes now to organize the calendar?" The user responds with a reply 434 by confirming to start the calendar consultation session. "Sure."

In aspects, the present disclosure may suggest having a calendar consultation session with the user when the condition determiner/learner identifies more than one calendar event with potential issues or inconsistencies for resolution. By including multiple events for adjustment in a calendar consultation session, the user can focus on resolving multiple events with issues in a limited time period, rather than sporadically having calendar consultation sessions whenever an issue arises, which results in an improvement in work efficiency. In some cases, a calendar consultation session may be requested within a time period of identifying an inconsistent calendar event so as to leave sufficient time for rescheduling, if necessary. In further aspects, the calendar consultant may suggest scheduling a calendar consultation session as a recurring event once a day, once a week, or once in every 10 days, etc.

In bot query 436, the calendar consultant informs the user a currently calendar event that is potentially at issue. The bot query 436 indicates: "First, I see that you are presenting at 'Presentation on Project X' on at 1:30 pm on Wednesday. You have a busy morning. Would you like to allocate a focus time in the morning?" In aspects, the bot query 436 reflects a result of the condition determiner/learner (e.g., the condition determiner/learner 122 as shown in FIG. 1) identifying a calendar event having a potential issue. For instance, the calendar event may be inconsistent with a time-management condition for scheduling lead-time before a meeting in which the user is presenting. The bot query 436 further includes an inference made by the calendar consultant that the user is making a presentation at meeting 416. For instance, the calendar consultant may derive the inference based on the title of the meeting, an attached agenda or presentation, or the like. Additionally, the calendar consultant may infer, e.g., based on a number of calendar events before the meeting 416 (e.g., Technical Trend Brief meeting 418 and Lunch with Boss 414), that the user has a busy morning and likely needs to allocate some time in preparing for the presentation before the meeting 416. In some cases, a time-management condition for the user may specify that preparation time should be scheduled before a meeting in which the user is presenting. Since meeting 416 is inconsistent with the condition, the calendar consultant may initiate the calendar consultation dialogue 404A. User response 438 indicates an acknowledgement to allocate focus time of 90 minutes: "Yes. Perhaps for 90 minutes to focus."

In bot dialogue 440, the calendar consultant evaluates Alice's calendar to identify a 90-minute time period on the morning of Wednesday before the meeting 416 for focus time. For instance, based on a time-management condition, the calendar consultant may determine that Lunch with Boss 414 has priority over Technical Trend Brief meeting 418. The bot dialogue 440 indicates: "Ok. I see that there are two meetings that are already scheduled in the morning. Would you like to decline an invitation for the Tech Trend Briefing at 10 am and keep the Lunch with Boss? This way, you have 90 minutes from 10 am to 11:30 am to focus." In user dialogue 442, the user confirms, "Yes, decline the Tech meeting." That is, the user instructs the calendar consultant to open a 90-minute time period and schedule a focus time 412 by declining the Technical Trend Brief meeting 418 between 10 am and 11 am. Following the confirmation by the user, the calendar consultant may automatically update Alice's calendar by declining the Technical Trend Brief meeting 418 and creating a new meeting for focus time 412.

In bot dialogue 444, the calendar consultant confirms that the updates to the calendar are complete. The calendar consultant further confirms the updated schedule to the user. The bot dialogue 444 indicates, "Done. You have a focus time from 10 am to 11:30 am, and then lunch with Boss at noon."

FIG. 4B illustrates an example GUI 400B of a calendar with a calendar consultation dialogue between a calendar consultant and a user (e.g., Alice). The example GUI 400A represents a part of the example GUI 400B by illustrating the calendar consultation dialogue 404B. In an example, the calendar consultation dialogue 404B illustrates a calendar consultation session that is distinct from FIG. 4A. A bot dialogue 450 indicates, "Hi Alice, I am to here to help you clean up your calendar. There are THREE events that need your attention. Do you have time now?" In user dialogue 452, the user confirms, "Sure."

The calendar consultant then starts a dialogue for resolving a first issue. Bot dialogue 454 indicates, "First, I see that you are presenting at "Presentation on Project X" at 1:30 pm on Wednesday. You have a busy morning. Would you like to allocate a focus time in the morning?" The user responses by specifying three hours as a request to create a focus time for the user. User dialogue 456 indicates, "Yes. I need to three hours to focus." In an example, the disclosed technology may identify Alice as an intermediate project manager whose time-management goals include efficiently managing projects with a team of collaborating members based on preregistered organizational information about Alice. For example, the disclosed technology may identify Alice's high-priority activities based on one or more time-management conditions, such as specifying self-focus time should be scheduled before presentations and/or prioritizing one-on-one interactions with project members. Accordingly, the present disclosure may determine a need for a calendar consultation session when calendar events are inconsistent with Alice's time-management goals.

In this example, bot dialogue 458 indicates that the calendar consultant is attempting to allocate three hours for scheduling focus time and has identified a first issue (e.g., inconsistent calendar event). The bot dialogue 458 indicates, "Ok. Let's see if you have three hours between 10 am to 1 pm. You have a Tech Trend meeting at 10 am for one hour and a Lunch with Boss at noon. You have attended the Tech Trend meeting at 60% of time. Would you like to decline the invitation for the Tech Trend meeting at 10 am?" The user responds by accepting the suggestion made by the calendar consultant. User dialogue 460 indicates, "Yes, decline the Tech Trend." The calendar consultant may then automatically perform updating of the calendar (e.g., declining the Tech Trend meeting at 10 am) and confirms a completion of the update to the user by bot dialogue 462 indicating, "Done."

FIG. 4C illustrates an example GUI 400C of a calendar with a calendar consultation dialogue between a calendar consultant and a user (e.g., Alice). The example GUI 400C represents a part of the example GUI 400A by illustrating the calendar consultation dialogue 404C. In an example, the calendar consultation dialogue 404C is a continuation of the calendar consultation dialogue 404B in FIG. 4B. After resolving the first issue associated with scheduling a three-hour focus time by opening a time period between 10 am and 11 am, the calendar consultant proceeds to identify a second issue (e.g., inconsistent calendar event) between noon and 1 pm. In an example, the calendar consultant identifies an option of moving the Lunch with Boss 414 to Friday, when the Manager is available. A bot dialogue 464 indicates, "Next, looks like you and Manager are both available for lunch on Friday. Would you like to move your lunch to Friday?" In the example, the user may decline the lunch meeting with the Manager and propose Friday at noon for rescheduling the lunch meeting. The user may accept the suggestion in user dialogue 466 indicating, "Sure."

The calendar consultant may proceed to propose rescheduling the lunch with boss 414 to Friday based on the acknowledgement by the user. A bot dialogue 468 then indicates, "Done. You have three hours of a focus time between 10 am and 1:30 pm on Wednesday." In an example, the calendar consultant confirms scheduling the focus time and then continues to describe another inconsistent calendar event via bot dialogue 468, "Second, I see that Alice/Kate 1-1 overlaps with My Tech Trend Brief on Thurs. Would you like to resolve?" In an example, this inconsistent calendar event relates to a scheduling conflict in which two meetings are scheduled for the same time slot. The user approves the recommendation in user dialogue 470 indicating, "Yes."

The calendar consultant repeats the confirmation and then suggests an option for resolving the scheduling conflict. Bot dialogue 472 indicates, "Ok. Based on your prioritizing one-on-one meetings, let's keep the Alice/Kate 1-1. Since you are the organizer for My Tech Trend Brief, would you like to reschedule to next week at 1 pm on Thursday?" In aspects, the calendar consultant generates the suggestion using the personal scheduling model (e.g., the personal scheduling model 144 as shown in FIG. 1) and applying a time-management condition for prioritizing one-on-one meetings with team members. The user agrees with the suggestion in user dialogue 474 indicating, "Yes, sounds good."

In an example, the personal scheduling model may generate recommendations based on one or more time-management conditions. In this example, the personal scheduling model may recommend rescheduling a calendar event determined to have a lower priority than another calendar event determined to have a higher priority (e.g., based on a time-management condition specifying a preference for one-on-one meetings). The model may evaluate information such as whether the user is an organizer of an event, a participant (e.g., an invitee) of an event, whether a participant of the event would make the presence of the user important, whether the user has a particular role (e.g., a presenter) of the event, and the like. In aspects, the disclosed technology may use personal information in the personal profile associated with the user to determine how to prioritize events. For example, the user may value one-on-one meetings as more important than group meetings. Here, the calendar consultant mentions that the user is the organizer of My Tech Trend Brief event, and thus infers that the user may reschedule the event rather than declining the lower-priority event.

The calendar consultant may then proceed to update Alice's calendar by keeping the Alice/Kate one-on-one meeting and rescheduling the My Tech Trend Brief event to start at 1 pm on Thursday of the following week.

FIG. 4D illustrates an example GUI 400D of a calendar with a calendar consultation dialogue between a calendar consultant and a user (e.g., Alice). The example GUI 400D represents a part of the example GUI 400A by illustrating the calendar consultation dialogue 404D. In an example, the calendar consultation dialogue 404D is a continuation of the calendar consultation dialogue 404C in FIG. 4C.

After resolving the second issue of a scheduling conflict of two meetings, the calendar consultant moves on to a third issue for resolution. Bot dialogue 480 indicates, "Third, I see that you tend to join virtual meetings about 5 minutes after the hour (in 78% of the meetings). Would you like to reschedule virtual recurring meetings with you as an organizer to start 5 minutes after the hour?" Here, for the third issue, the calendar consultant determines that the user tends to join meetings about five minutes after the hour based on calendar information (e.g., Alice's previous actions), for example. In further aspects, based on the calendar information, one or more time-management conditions may be determined. Based on the one or more time-management conditions, the calendar consultant may then make a recommendation to reschedule virtual recurring meetings with the user as organizer to start at five minutes after the hour. The user approves the recommendation in user dialogue 482 indicating, "Sure."

The calendar consultant may proceed to update the scheduled times for virtual recurring meetings to start at five minutes after the hour. Bot dialogue 484 indicates, "Done. I have rescheduled eight recurring meetings to start at 5 minutes after the hour."

Once the calendar consultant has resolved the inconsistent calendar events, the calendar consultant may query the user regarding whether the user has any concerns with the calendar. Bot dialogue 486 indicates, "Do you have any concerns over your current calendar?" In this example, the user answers that there are no concerns at the time via user dialogue 488 indicating, "No." After confirming that the user has no outstanding issues, the calendar consultant may end the calendar consultation session. Bot dialogue 490 indicates, "Great. Thank you for your time with Calendar Consultant. This concludes your calendar consultation session. Have a great week!"

FIG. 4E illustrates an example GUI 400E of a calendar with a calendar consultation dialogue between a calendar consultant and a user (e.g., Alice). The example GUI 400E represents an alternative example of an interaction between the calendar consultant and the user. In particular, the example GUI 400E illustrates the calendar consultant presenting options for selection by the user. In contrast to bot dialogue 480, bot dialogue 492 indicates, "Third, I see that you tend to join virtual meetings scheduled on the hour about 5 minutes after the hour (in 78% of the meetings). Would you like to reschedule virtual recurring meetings with you as an organizer to start 5 minutes after the hour? Please select Accept or Decline." Here, the calendar consultant requests the user to select either Accept or Decline in response to the recommendation for rescheduling a meeting. The user may respond by entering text, "Accept," "Decline," or other textual expressions that are semantically similar to one of the two options. Additionally, or alternatively, the present disclosure indicates a set of buttons, each corresponding to an available option. For instance, user selection of button 494 indicates "Accept" and user selection of button 496 indicates "Decline." In this case, the user may interactively select (e.g., using a mouse cursor, touching on a touch screen of a mobile device, and the like) a button to enter a response to the calendar consultant.

FIG. 5 illustrates an example of a method for a calendar consultation according to the aspects of the present disclosure. A general order of the operations for the method 500 is shown in FIG. 5. Generally, the method 500 begins with start operation 502 and ends with end operation 528. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-E, 6, 7, and 8A-B.

Following start operation 502, the method 500 begins with a retrieve operation 504, which retrieves calendaring information, such as past and current calendar events, scheduling data, message data, event log data (e.g., user actions), and the like. In aspects, the retrieve operation 504 may retrieve the calendar information from a calendar server and/or a message server. In some aspects, the retrieve operation 504 may receive event log data associated with video/audio conference meetings and other user activities that have taken place from a communication server.

Prompt operation 506 prompts the user for initiating a calendar consultation session for receiving user personal information. During the calendar consultation session, the prompt operation 506 may include querying the user about personal or professional roles and responsibilities, personal preferences for scheduling meetings, personal priorities for appointments or meetings, and the like. For example, a role may include but is not limited to a corporate officer, an intermediate manager, an engineer, a scientist, a salesperson, a technical support, a father, a mother, a student, and the like. A user response to the query may be stored as an aspect of the user personal information. By prompting and providing an interactive calendar consultation session, the disclosed technology interactively receives user personal information for better optimizing the user's calendar based on the user's time-management goals.

At determine user time-management conditions operation 508, user time-management conditions may be determined based on the personal information and/or the calendar information. In aspects, the user time-management conditions include a set of rules that define how, when, and with whom a user desires to schedule calendar events. In an example, a user action (e.g., calendar information) indicates that the user has been five (5) minutes late 80% of the time when joining a virtual meeting scheduled to start on the hour. Based on this user action, a user time-management condition may be determined that indicates, when the user is an organizer, a virtual meeting should be scheduled five (5) minutes past the hour. In another example, a user may have a preference (e.g., personal information) for scheduling preparation time prior to a meeting in which the user is presenting. Based on this user preference, a user time-management condition may be determined that indicates, when the user is a presenter, preparation time should be scheduled prior to a calendar event. In yet another example, a user may prioritize (e.g., personal information) one-on-one meetings over group meetings. Based on this user priority, a time-management condition may be determined that indicates, when a one-on-one meeting conflicts with a group meeting, the group meeting should be rescheduled. In this way, calendar information and/or personal information may be used to determine time-management conditions customized for a particular user.

In additional examples, time-management conditions may be determined based on a user role (e.g., personal information). For instance, time-management conditions of a corporate officer may be associated with managing a business of a corporation, which requires the user to focus time planning a future course of business, making decisions in a timely manner, and communicating through managers to implement the plans and decisions. In another example, time-management conditions of an engineer may be associated with focusing time designing and/or building something, rather than being distracted by multiple meetings; in contrast, time-management conditions for a project engineer manager may focus time on meeting with team members to direct or follow up on a collaborative engineering project. In yet another example, time-management conditions of a father who is also a professional may be associated with balancing time among work, family, and personal improvement. As time-management conditions reflect preferences of the user to focus time on specific types of tasks, the present disclosure determines whether calendar events are consistent with the determined time-management conditions to optimize the user's calendar.

At determine inconsistency operation 510, inconsistencies between the user's calendar and the determined user time-management conditions may be determined. From an example above, where a time-management condition specifies that virtual meetings should be scheduled five minutes past the hour, an inconsistency may be determined when a virtual meeting is scheduled on the hour. In another example, where a time-management condition specifies that preparation time should be scheduled before a presentation, an inconsistency may be determined when the user is a presenter at a meeting and preparation time has not been scheduled before the meeting. In another example, where a time-management condition specifies that one-on-one meetings are prioritized over group meetings, an inconsistency may be determined when a one-on-one meeting is scheduled at the same time as a group meeting.

At decision operation 512, it may be determined whether to recommend initiating a calendar consultation session for resolving inconsistencies. In an example, the decision operation 512 may be based on a number of inconsistencies at issue as a threshold for deciding whether to recommend a calendar consultation session with the user. In another example, the decision operation 512 may use a level of urgency associated with resolving inconsistencies to decide whether to recommend a calendar consultation session with the user. In yet another example, the decision operation 512 may be based on a degree of inconsistency between a calendar event and a time-management condition to decide whether to recommend a calendar consultation session with the user.

When the decision operation 512 decides that a calendar consultation session is unnecessary, the method may return to the retrieve operation 504 to resume retrieving data. When the decision operation 512 decides that there is a need for a calendar consultation session, the method may proceed to a prompt operation 514. At prompt operation 514, a prompt recommending initiating a calendar consultation session may be generated through interactive user interface. In aspects, the prompt operation 514 may prompt the user for a calendar consultation session when the user starts a calendar application or views a calendar. Additionally, or alternatively, the prompt operation 514 may prompt the user for a calendar consultation session using an email, a message, and/or a popup dialogue window on a client device. The user may respond to the prompt operation 514 by approving initiating a calendar consultation session. In response to an approval, a calendar consultation session may be initiated by starting a dialog between a calendar consultant and the user in a user interface.

At cause display operation 516, inconsistencies determined at determine inconsistency operation 510 and recommendations determined based on the one or more time-management conditions may be interactively displayed to the user. In aspects, the cause display operation 516 may indicate a number of issues needed for resolution during the calendar consultation session and may proceed to sequentially resolve each respective issue. In some aspects, the inconsistencies may be ordered temporally based on their occurrence on the user calendar. In other aspects, inconsistencies may be ordered or ranked based on a level of urgency of the inconsistency. Recommendations for resolving each inconsistency may also be displayed for approval and/or selection by the user.

At receive operation 518, a user input in response to the recommendations for updating calendar events may be received. For instance, the user response may be an approval or a denial of the recommendation posed by the calendar consultant. In aspects, at receive operation 518, the user input may be received in response to the calendar consultant providing a set of selectable buttons in a GUI. Additionally, or alternatively, the receive operation 518 may receive the user input as text input.

In an example, the cause display operation 516 and the receive operation 518 may use natural language processing and semantic processing to interact with the user using a natural language. In some examples, a calendar consultation session may take place based on a textual conversation (e.g., chat messaging) but may also take place based on other types of communications, including but not limited to voice-based conversations.

At decision for updating operation 520, it may be decided whether to update a calendar event in a calendar. In aspects, the decision for updating operation 520 may decide based on an approval or a denial of a recommendation received from the user at receive operation 518. When the decision for updating operation 520 is "No," the method may proceed to decision operation 521. At decision operation 521, it may be determined whether there are additional issues for resolution. If not, the method may proceed to end operation 528. Additionally, or alternatively, when there are additional inconsistencies, the method may return to cause display operation 516 to process a next issue at hand in the calendar consultation session.

When the decision for updating operation 520 is "Yes," the method may proceed to automatically update operation 522. At automatically update operation 522, one or more calendar event may be automatically updated to resolve an inconsistency presented during the calendar consultation session. At automatically update operation 522 may transmit a request for updating information associated with a calendar event to the calendar server (e.g., the calendar server 108 as shown in FIG. 1).

At update/train operation 524, updates to a personal profile may be updated based on the confirmed user approval for resolving scheduling issues. In aspects, the update/train operation 524 may include training a personal scheduling model (e.g., the personal scheduling model 144 as shown in FIG. 1). In an example, the update/train operation 524 may use information associated with updating calendar events as training data (e.g., a ground truth data that reflects user approval to reschedule calendar events) to train the personal scheduling model. In some aspects, the update/train operation 524 may include an interactive user interface to confirm and enable the user to edit and/or confirm the user approval before training the personal scheduling model.

At cause display operation 526, display of the updated calendar schedule may be caused. In aspects, the updated calendar schedule may indicate a set of calendar events for which the calendar consultation session has interactively resolved issues for the user. The method 500 may end with the end operation 528.

As should be appreciated, operations 502-528 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes an event data receiver 630, a condition identifier 632, a prompt generator 634, a consultation dialog processor 636, and a calendar schedule updater 638, as described in more details in FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., a user of the client device 102 as shown in the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., a conversation application server 104, a messaging server 106, a calendar server 108, a calendar consultation processor 110 (server), and a communication server 112 as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for calendar consultation with a user according to at least the examples provided in the sections below:

In one aspect, the technology relates to a computer-implemented method for a calendar consultation with a user. The method includes receiving calendar information and personal information for a user, wherein the calendar information includes data associated with a plurality of calendar events and user actions, wherein each calendar event comprises an event type and an event context; based on identifying patterns in at least one of the calendar information or the personal information, determining one or more time-management conditions, wherein each time-management condition represents a pattern associated with at least one of the calendar information or the personal information; determining an inconsistency between at least one calendar event and at least one time-management condition of the one or more time-management conditions; generating, based on the inconsistency, a prompt for scheduling a calendar consultation session with the user; in response to a user acceptance of the prompt, causing display of a description of the inconsistency; based on the one or more time-management conditions, automatically generating a recommendation for resolving the inconsistency using a scheduling model trained based on the one or more time-management conditions, wherein the recommendation is a suggestion for updating the at least one calendar event; and causing display of the recommendation and a prompt for an approval. The method further include determining the at least one time-management condition by identifying a pattern associated with a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and determining the inconsistency by identifying a difference between at least one calendar parameter of the calendar event and the at least one time-management condition. The method further includes updating a personal profile with the approval to update the at least one calendar event, wherein the personal profile includes the personal information; and training the scheduling model associated with the user using training data, wherein the training data includes the approval to update the at least one calendar event. The personal information is interactively received in response to a question during a previous calendar consultation session, and wherein the interactively receiving includes using natural language processing of a user input. The calendar consultation session includes causing display of descriptions of a plurality of inconsistencies, wherein the plurality of inconsistencies includes the inconsistency. The calendar consultation session is a recurring calendar event. The personal profile includes the one or more time-management conditions based on the personal information. The trained scheduling model predicts whether the calendar consultation session is needed based on the inconsistency, and automatically generates the recommendation for updating the at least one calendar event to resolve the inconsistency. The personal profile includes one or more priority levels for rescheduling calendar events, wherein the one or more priority levels correspond to whether the user is an organizer of the at least one calendar event, an invitee of the at least one calendar event, a number of participants of the at least one calendar event, and a position within an organization of a participant of the at least one calendar event. The method further includes interactively receiving the approval to update the at least one calendar event to resolve the inconsistency; and automatically updating the at least one calendar event to resolve the inconsistency.

Another aspect of the technology relates to a system for a calendar consultation. The system includes a processor; and a memory storing computer-executable instructions that when executed by the processor cause the system to execute a method including receiving calendar information and personal information for a user, wherein the calendar information includes data associated with a plurality of calendar events and user actions, wherein each calendar event comprises an event type and an event context; determining, based on identifying patterns in at least one of the calendar information or the personal information, one or more time-management conditions, wherein each time-management condition represents a pattern associated with at least one of the calendar information or the personal information; determining an inconsistency between at least one calendar event and at least one time-management condition of the one or more time-management conditions; generating, based on the inconsistency, a prompt for scheduling a calendar consultation session with the user; automatically generating, based on the at least one of the one or more time-management conditions, a recommendation for resolving the inconsistency using a scheduling model trained based on the one or more time-management conditions, wherein the recommendation includes updating the at least one calendar event; and causing display of a description of the inconsistency and the recommendation for resolving the inconsistency during the calendar consultation session. The computer-executable instructions when executed by the processor further cause the system to execute a method include determining the at least one time-management condition by identifying a pattern in a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and determining the inconsistency by identifying a difference between at least one calendar parameter of the calendar event and the at least one time-management parameter. The computer-executable instructions when executed by the processor further cause the system to execute a method include updating a personal profile with an approval to update the at least one calendar event, wherein the personal profile includes the personal information; and training the scheduling model associated with the user using training data, wherein the training data includes the approval to update the at least one calendar event. The personal information is interactively received in response to a question during a previous calendar consultation session, and wherein the interactively receiving includes using natural language processing of a user input. The calendar consultation session includes causing display of descriptions of a plurality of inconsistencies, wherein the plurality of inconsistencies includes the inconsistency. The calendar consultation session is a recurring calendar event. The personal profile includes the personal information and the one or more time-management conditions associated with the personal information.

In still further aspects, the technology relates to a computer-implemented method. The method includes receiving calendar information and personal information for a user, wherein the calendar information includes data associated with a plurality of calendar events and user actions, wherein each calendar event comprises an event type and an event context; determining, based on identifying patterns in at least one of the calendar information or and the personal information, one or more time-management conditions, wherein each time-management condition represents a pattern associated with at least one of the calendar information or the personal information; determining a plurality of instances of inconsistency between at least one time-management condition of the one or more time-management conditions; generating, based on the plurality of instances of inconsistency, a prompt for scheduling a calendar consultation session with the user; and automatically generating, based on the one or more time-management conditions, a recommendation for resolving at least one of the plurality of instances of inconsistency using a scheduling model trained based on the one or more time-management conditions. The method further includes determining the at least one time-management condition by identifying a pattern in a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and determining the at least one of the plurality of instances of inconsistency by identifying a difference between at least one calendar parameter of the calendar event and the at least one time-management condition. The plurality of instances of inconsistency includes an occasion where the user joins a series of routinely scheduled calendar event after a predetermined period of time.

Any of the one or more above aspects in combination with any other of the one or more aspect. Any of the one or more aspects as described herein.

What is claimed is:

1. A computer-implemented method for a calendar consultation with a user, the method comprising:
    receiving calendar information and personal information for a user, wherein the calendar information includes data associated with a plurality of calendar events and user actions, wherein each calendar event comprises an event type and an event context;
    based on identifying patterns in at least one of the calendar information or the personal information, determining one or more time-management conditions, wherein each time-management condition represents a pattern associated with at least one of the calendar information or the personal information;
    determining an inconsistency between at least one calendar event and at least one time-management condition of the one or more time-management conditions;
    generating, based on the inconsistency, a prompt for scheduling a calendar consultation session with the user, wherein the prompt comprises a time duration for the calendar consultation session for scheduling;
    displaying the prompt for scheduling the calendar consultation session in a dialogue section of an interactive user interface of a calendar display, wherein the dialogue section is adjacent to a calendar information section of the calendar display;
    in response to a user acceptance of the prompt by receiving an interactive input in the dialogue section in the interactive user interface to schedule the calendar consultation session, generating a calendar event of the calendar consultation session for the time duration, wherein, once scheduled, the calendar consultation session comprises causing interactively display of a description of the inconsistency;
    based on the one or more time-management conditions, automatically generating a recommendation for resolving the inconsistency using a scheduling model trained based on the one or more time-management conditions, wherein the recommendation is a suggestion for updating the at least one calendar event;
    causing display of the recommendation to the user and the prompt for an approval by the user during the scheduled calendar consultation session with the user, wherein the display of the recommendation in the interactive user interface comprises a highlighted display of a region corresponding to the recommendation, and the highlighted display of the region is distinct from one or more regions corresponding to scheduled calendar events on the calendar display; and
    further causing an update of the display of the calendar display according to the generated calendar event with the user acceptance during the calendar consultation session.

2. The computer-implemented method of claim 1, the method further comprising:
  determining the at least one time-management condition by identifying a pattern associated with a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and
  determining the inconsistency by identifying a difference between at least one calendar parameter of the calendar event and the at least one time-management condition.

3. The computer-implemented method of claim 1, the method further comprising:
  updating a personal profile with the approval to update the at least one calendar event, wherein the personal profile includes the personal information; and
  training the scheduling model associated with the user using training data, wherein the training data includes the approval to update the at least one calendar event.

4. The computer-implemented method of claim 3, wherein the personal profile includes the one or more time-management conditions based on the personal information.

5. The computer-implemented method of claim 3, wherein the personal profile includes one or more priority levels for rescheduling calendar events, wherein the one or more priority levels correspond to whether the user is an organizer of the at least one calendar event, an invitee of the at least one calendar event, a number of participants of the at least one calendar event, and a position within an organization of a participant of the at least one calendar event.

6. The computer-implemented method of claim 1, wherein the personal information is interactively received in response to a question during a previous calendar consultation session, and wherein the interactively receiving includes using natural language processing of a user input.

7. The computer-implemented method of claim 1, wherein the calendar consultation session includes causing display of descriptions of a plurality of inconsistencies, wherein the plurality of inconsistencies includes the inconsistency.

8. The computer-implemented method of claim 1, wherein the calendar consultation session is a recurring calendar event.

9. The computer-implemented method of claim 1, wherein the trained scheduling model predicts whether the calendar consultation session is needed based on the inconsistency, and automatically generates the recommendation for updating the at least one calendar event to resolve the inconsistency.

10. The computer-implemented method of claim 1, further comprising:
  interactively receiving the approval to update the at least one calendar event to resolve the inconsistency; and
  automatically updating the at least one calendar event to resolve the inconsistency.

11. A system for a calendar consultation, the system comprising:
  a processor; and
  a memory storing computer-executable instructions that when executed by the processor cause the system to execute operations comprising:
    receiving calendar information and personal information for a user, wherein the calendar information includes data associated with a plurality of calendar events and user actions, wherein each calendar event comprises an event type and an event context;
    determining, based on identifying patterns in at least one of the calendar information or the personal information, one or more time-management conditions, wherein each time-management condition represents a pattern associated with at least one of the calendar information or the personal information;
    determining an inconsistency between at least one calendar event and at least one time-management condition of the one or more time-management conditions;
    generating, based on the inconsistency, a prompt for scheduling a calendar consultation session with the user, wherein the prompt comprises a time duration for the calendar consultation session for scheduling;
    displaying the prompt for scheduling the calendar consultation session in a dialogue section of an interactive user interface of a calendar display, wherein the dialogue section is adjacent to a calendar information section of the calendar display;
    in response to a user acceptance of the prompt by receiving an interactive input in the dialogue section in the interactive user interface to schedule the calendar consultation session, generating a calendar event of the calendar consultation session for the time duration, wherein, once scheduled, the calendar consultation session comprises causing interactively display of a description of the inconsistency;
    automatically generating, based on the at least one of the one or more time-management conditions, a recommendation for resolving the inconsistency using a scheduling model trained based on the one or more time-management conditions, wherein the recommendation includes updating the at least one calendar event;
    causing display of the description of the inconsistency and the recommendation for resolving the inconsistency to the user, wherein the display of the recommendation in the interactive user interface comprises a highlighted display of a region corresponding to the recommendation, and the highlighted display of the region is distinct from one or more regions corresponding to scheduled calendar events on the calendar display; and
    further causing an update of the display of the calendar display according to the generated calendar event with the user acceptance during the calendar consultation session.

12. The system of claim 11, the computer-executable instructions when executed by the processor further cause the system to execute operations comprising:
  determining the at least one time-management condition by identifying a pattern in a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and determining the inconsistency by identifying a difference between at least one calendar parameter of the calendar event and the at least one time-management parameter.

13. The system of claim 11, the computer-executable instructions when executed by the processor further cause the system to execute operations comprising:
updating a personal profile with an approval to update the at least one calendar event, wherein the personal profile includes the personal information; and
training the scheduling model associated with the user using training data, wherein the training data includes the approval to update the at least one calendar event.

14. The system of claim 13, wherein the personal profile includes the personal information and the one or more time-management conditions associated with the personal information.

15. The system of claim 11, wherein the personal information is interactively received in response to a question during a previous calendar consultation session, and wherein the interactively receiving includes using natural language processing of a user input.

16. The system of claim 11, wherein the calendar consultation session includes causing display of descriptions of a plurality of inconsistencies, wherein the plurality of inconsistencies includes the inconsistency.

17. The system of claim 11, wherein the calendar consultation session is a recurring calendar event.

18. A computer-implemented method, comprising:
receiving calendar information and personal information for a user, wherein the calendar information includes data associated with a plurality of calendar events and user actions, wherein each calendar event comprises an event type and an event context;
determining, based on identifying patterns in at least one of the calendar information or and the personal information, one or more time-management conditions, wherein each time-management condition represents a pattern associated with at least one of the calendar information or the personal information;
determining a plurality of instances of inconsistency between at least one time-management condition of the one or more time-management conditions;
generating, based on the plurality of instances of inconsistency, a prompt for scheduling a calendar consultation session with the user, wherein the prompt comprises a time duration for the calendar consultation session for scheduling;
displaying the prompt for scheduling the calendar consultation session in a dialogue section of an interactive user interface of a calendar display, wherein the dialogue section is adjacent to a calendar information section of the calendar display;
in response to a user acceptance of the prompt by receiving an interactive input in the dialogue section in the interactive user interface to schedule the calendar consultation session, generating a calendar event of the calendar consultation session for the time duration, wherein, once scheduled, the calendar consultation session comprises causing interactively display of a description of an instance of inconsistency of the plurality of instances of inconsistency;
automatically generating, based on the one or more time-management conditions, a recommendation for resolving at least one of the plurality of instances of inconsistency using a scheduling model trained based on the one or more time-management conditions;
causing display of the description of the instance of inconsistency and the recommendation for resolving the instance of inconsistency to the user, wherein the display of the recommendation in the interactive user interface comprises a highlighted display of a region corresponding to the recommendation, and the highlighted display of the region is distinct from one or more regions corresponding to scheduled calendar events on the calendar display; and
further causing an update of the display of the calendar display according to the generated calendar event with the user acceptance during the calendar consultation session.

19. The computer-implemented method of claim 18, the method further comprising:
determining the at least one time-management condition by identifying a pattern in a calendar parameter associated with the calendar information or a personal parameter associated with the personal information, wherein the at least one time-management condition includes at least one time-management parameter representing the pattern associated with the calendar parameter associated with the calendar information or the personal parameter associated with the personal information; and
determining the at least one of the plurality of instances of inconsistency by identifying a difference between at least one calendar parameter of the calendar event and the at least one time-management condition.

20. The computer-implemented method of claim 18, wherein the plurality of instances of inconsistency includes an occasion where the user joins a series of routinely scheduled calendar event after a predetermined period of time.

* * * * *